United States Patent [19]
Shimizu

[11] Patent Number: 5,827,926
[45] Date of Patent: Oct. 27, 1998

[54] MOISTURE-CURABLE, HOT-MELT COMPOSITION

[75] Inventor: Yoshinori Shimizu, Tokyo, Japan

[73] Assignee: Minnesota Mining and Manufacturing Company, St. Paul, Minn.

[21] Appl. No.: 745,364

[22] Filed: Nov. 8, 1996

[51] Int. Cl.⁶ .............................. C08L 33/06; C08L 75/04
[52] U.S. Cl. ........................................... 525/127; 525/131
[58] Field of Search ..................................... 525/127, 131

[56] References Cited

U.S. PATENT DOCUMENTS

| | | | |
|---|---|---|---|
| 4,068,050 | 1/1978 | Danzig et al. | 526/21 |
| 4,110,412 | 8/1978 | Danzig et al. | 260/873 |
| 4,661,542 | 4/1987 | Gilch et al. . | |
| 4,775,719 | 10/1988 | Markevka et al. . | |
| 4,808,255 | 2/1989 | Markevka et al. . | |
| 4,818,804 | 4/1989 | Kuriyama et al. | 526/211 |
| 4,820,368 | 4/1989 | Markevka et al. . | |
| 4,889,915 | 12/1989 | Brauer et al. . | |
| 4,985,535 | 1/1991 | Takada et al. . | |
| 4,999,407 | 3/1991 | Gilch et al. . | |
| 5,015,321 | 5/1991 | Jansen et al. | 156/331.7 |
| 5,019,638 | 5/1991 | Muller et al. . | |
| 5,021,507 | 6/1991 | Stanley et al. . | |
| 5,034,453 | 7/1991 | Takada et al. . | |
| 5,036,143 | 7/1991 | Brauer et al. | 524/361 |
| 5,058,607 | 10/1991 | Carter et al. | 131/58 |
| 5,115,073 | 5/1992 | Meckel et al. . | |
| 5,155,180 | 10/1992 | Takada et al. | 525/440 |
| 5,156,911 | 10/1992 | Stewart | 428/355 |
| 5,173,538 | 12/1992 | Gilch et al. . | |
| 5,266,606 | 11/1993 | Gilch et al. | 521/159 |
| 5,367,036 | 11/1994 | Saito et al. | 525/458 |
| 5,418,288 | 5/1995 | Kawasaki et al. . | |
| 5,472,785 | 12/1995 | Stobbie, IV et al. | 428/423.1 |

FOREIGN PATENT DOCUMENTS

| | | |
|---|---|---|
| WO 94/24219 | 10/1994 | European Pat. Off. ........... C09J 7/02 |
| WO 96/35734 | 11/1996 | European Pat. Off. ........ C08G 18/62 |
| 900235161 | 9/1990 | Japan .............................. C09J 133/10 |
| 3-88886 | 4/1991 | Japan . |
| 4-178417 | 6/1992 | Japan . |
| 04272917-A | 9/1992 | Japan . |
| 5-230166 | 9/1993 | Japan . |
| 06128550-A | 5/1994 | Japan . |
| 06158014-A | 6/1994 | Japan . |
| 06158017-A | 6/1994 | Japan . |
| 92/07015 | 4/1992 | WIPO . |

OTHER PUBLICATIONS

"Synthesis of Polyurethane Graft Copolymers by Polyaddition Reaction of Dihydroxyl–Terminated Macromonomers", Polymer Bulletin 8, 239–244 (1982).

"Synthesis of Polyamide–Poly(methyl methacrylate) Graft Copolymers by Polycondensation Reactions of Macromonomers", Polymer Bulletin 5, 361–366 (1981).

*Primary Examiner*—Patricia A. Short
*Attorney, Agent, or Firm*—Minnesota Mining and Manufacturing Company

[57] ABSTRACT

There are provided moisture-curable hot-melt compositions comprising a polyurethane prepolymer and a crystalline polymer obtained from monomer(s) containing at least one crystalline ethylenically unsaturated monomer with no active hydrogen, which have low melt viscosities and high initial impact strength and final strength. The monomers may also contain amorphous ethylenically unsaturated monomers with no active hydrogen, in addition to the crystalline monomer. Typical crystalline monomers are (meth)acrylate esters of non-tertiary alcohols, the alkyl portions of which comprise 16 or more carbon atoms. Typical amorphous monomers are (meth)acrylate esters of non-tertiary alcohols, the alkyl portions of which comprise no more than 15 carbon atoms. Use of an alkyl acrylamide as one of the amorphous monomers is advantageous for improving the performance of the moisture-curable hot-melt adhesive.

23 Claims, No Drawings

MOISTURE-CURABLE, HOT-MELT COMPOSITION

FIELD OF THE INVENTION

The present invention relates to a moisture-curable, hot-melt composition. More specifically, the present invention relates to a composition comprising a polyurethane prepolymer modified with a crystalline polymer obtained by polymerizing a crystalline monomer.

BACKGROUND OF THE INVENTION

Hot-melt adhesives are solid at room temperature and applied in a molten state to a substrate. The substrate is then mated with another substrate while the adhesive is hot viscous liquid. Upon cooling, it solidifies and exhibits instant strength. Because of this rapid adhesion and easy handling, hot-melt adhesives are widely used in various industries. However, since all fundamental resin components of such hot-melt adhesives are thermoplastic resins, they have the inherent drawbacks of low adhesive strength and poor heat resistance. Consequently, the uses of hot-melt adhesives are presently limited to fields such as packaging and bookbinding which do not require heat resistance and high adhesive strength.

Moisture-curable hot-melt adhesives have been developed for the purpose of overcoming these drawbacks of hot-melt adhesives. These adhesives cure after application by action of moisture.

While conventional hot-melt adhesives are mixtures of a thermoplastic resin such as ethylene-vinyl acetate copolymer (EVA) and a tackifying resin, moisture-curable hot-melt adhesives usually have a polyurethane prepolymer with terminal isocyanate groups as the main component for rapid moisture curing and adhesion after curing, and thus despite being hot-melt adhesives, they are chemically different from conventional hot-melt adhesives, and their performance also differs considerably. For example, although with conventional hot-melt adhesives the strength of the material once it is cooled after application constitutes the final strength, moisture-curable hot-melt adhesives acquire gradually increasing strength after application as the reaction with moisture in the atmosphere proceeds. Consequently, while the final shear strength of conventional hot-melt adhesives is about the same as the initial strength, moisture-curable hot-melt adhesives usually become fully cured in 5–7 days, reaching a final shear strength of several times higher than those of conventional hot-melt adhesives. However, since the major components of moisture-curable hot-melt adhesives are polyurethane prepolymers with a molecular weight of about a few thousand to a few tens of thousand, a poor initial strength is exhibited immediately after cooling following application, compared to conventional hot-melt adhesives which use thermoplastic resins with a molecular weight of a few hundred thousand. Therefore, it is necessary to temporarily clamp the adhesion site with a clip or the like until the moisture curing progresses to exhibit some degree of material strength, and such use has been difficult in cases where external stress is applied immediately after application of the adhesive.

Many measures have been undertaken to produce moisture-curable hot-melt adhesives with high initial strength including, for example, (1) addition of a tackifying resin (Japanese Unexamined Patent Publication No. 3-88886, etc.), (2) addition of a thermoplastic resin (U.S. Pat. Nos. 4,775,719, 4,820,368, 4,808,255, 4,889,915, 5,021,507, 5,418,288, etc.), (3) combination of different polyurethane prepolymers (or polyols) (U.S. Pat. Nos. 5,173,538, 4,999,407, 4,661,542, 5,115,073, 5,034,453, 4,985,535, etc.) and (4) utilizing a polyurethane prepolymer with a specific structure (U.S. Pat. No. 5,019,638, etc.).

Japanese Unexamined Patent Publication No. 3-88886 describes a mixture of a polyurethane prepolymer and a cumaron/indene-based tackifying resin. Though this tackifying resin has the effect of increasing the initial adhesive strength, the heat resistance of the adhesive after curing is low, and problems such as phase separation and coloring also occur by aging.

U.S. Pat. No. 4,775,719 describes a mixture of an ethylene-vinyl acetate copolymer (EVA) or ethylene-ethyl acetate copolymer (EEA) and a polyurethane prepolymer. U.S. Pat. No. 4,820,368 describes a mixture of styrene-based block copolymer or EVA with a polyurethane prepolymer. U.S. Pat. No. 4,808,255 describes a mixture of EVA and a polyurethane prepolymer. U.S. Pat. No. 4,889,915 describes a mixture of a thermoplastic polyurethane polymer and a polyurethane prepolymer. This addition of a thermoplastic resin tends to drastically increase the melt viscosity of the moisture-curable hot-melt adhesive. Also, when such thermoplastic resins are added a tackifying agent may also be added to bring out the initial adhesion, but since tackifying agents cause the problems described above, they are not preferred for moisture-curable hot-melt adhesives.

U.S. Pat. Nos. 5,173,538 and 4,999,407 describe mixtures of polyurethane prepolymers with a glass transition temperature (Tg) of room temperature or above and polyurethane prepolymers with a glass transition temperature of room temperature or below. U.S. Pat. No. 4,661,542 describes a mixture of a linear polyurethane prepolymer and a branched polyurethane prepolymer. U.S. Pat. Nos. 5,034,453 and 4,985,535 describe polyurethane prepolymers created based on polyester polyols with different molecular weights. All of the moisture-curable hot-melt adhesives produced by these methods have the drawback of low initial cohesion of the adhesives even though some degree of initial adhesion is achieved.

U.S. Pat. No. 5,115,073 describes a polyurethane prepolymer based on a polyester polyol with a high melting point (65° C.–150° C.) and a polyester polyol with a relatively low melting point (30° C.–60° C.). The adhesive obtained by this method has the disadvantage of being brittle prior to curing.

U.S. Pat. No. 5,019,638 describes an aliphatic polyurethane prepolymer with at least 12 methylene groups. The adhesive obtained by this method is also brittle prior to curing as is the one disclosed in U.S. Pat. No. 5,115,073, and its initial strength is inadequate.

U.S. Pat. No. 5,021,507 describes a mixture of a low molecular weight (10,000–30,000) acrylic resin with no active hydrogen and a polyurethane prepolymer. The adhesive obtained by this method has improved cohesive and adhesive strength, and is also stated as having excellent initial adhesion. The acrylic resin used is believed to be amorphous.

The expanding fields of use for moisture-curable hot-melt adhesives with improved performance over conventional hot-melt adhesives has led to greater expectations for moisture-curable hot-melt adhesives with both low viscosity for easier dispensing and strong initial cohesion. Such moisture-curable hot-melt adhesives must naturally have adequate final strength.

The low viscosity referred to here is a low viscosity upon melting, and specifically it refers to a Brookfield viscosity of 50,000 cP or lower, and preferably 20,000 cP or lower, at 121° C. (250° F.). The initial cohesion is measured by the rate of crystallization or by an initial creep test, but even when these values are excellent it is often impractical for actual use. This is because the measurements are only measurements of the initial "static" strength, and do not take into consideration the various external stresses exerted after bonding and prior to use when put into actual use. Consequently, the initial cohesion referred to here represents the "dynamic" impact strength. A strong initial cohesive force is, specifically, an impact adhesive strength one minute after adhesion of at least 5 kg·cm, and preferably at least 10 kg·cm according to JIS K6855 (or ASTM D950). Also, the final strength refers to the overlap shear adhesive strength measured according to JIS K6851, and an adequate final strength is a shear adhesive strength of at least 15 kg/cm$^2$, and preferably at least 30 kg/cm$^2$. The desired characteristics for moisture-curable hot-melt adhesives are summarized in the following table.

| | Allowed value | Target value |
|---|---|---|
| Melt viscosity (cP, at 120° C.) | ≦50,000 | ≦20,000 |
| Initial impact strength (kg · cm) | ≧5 | ≧10 |
| Final strength (overlap shear strength) (kg/cm$^2$) | ≧15 | ≧30 |

SUMMARY OF THE INVENTION

As a result of much research on the subject explained above, the present inventor has found that addition of a crystalline polymer to a polyurethane prepolymer gives a moisture-curable hot-melt adhesive with high initial impact strength and final strength, and with a low melt viscosity. The crystalline polymer referred to here is a polymer obtained by polymerization of an ethylenically unsaturated crystalline monomer which has no active hydrogen and therefore is not reactive with the polyurethane prepolymer. A particularly preferred crystalline polymer according to the present invention is a crystalline polymer obtained by polymerization of a crystalline (meth)acrylate ester monomer. As used herein, the term "(meth)acrylate" means methacrylate or acrylate.

Thus, the present invention provides a moisture-curable hot-melt adhesive comprising a polyurethane prepolymer and a crystalline polymer obtained from monomer(s) containing at least one crystalline ethylenically unsaturated monomer with no active hydrogen.

For the purpose of the present invention, the term "crystalline" means that the material has sufficient crystallinity such that it exhibits a measurable melting temperature (Tm), although such a material is not required to be 100% crystalline.

The "crystalline polymer" referred to here is one with a melting point of 15°–135° C., preferably 20°–120° C. and more preferably 25°–100° C.

The "crystalline polymer" is a polymer obtained from monomer(s) containing a crystalline monomer at 5–100 wt %, preferably 10–90 wt % and more preferably 30–80 wt %. The weight average molecular weight of the crystalline polymer is generally 5,000–100,000. The weight average molecular weight of the crystalline polymer is preferably greater than 10,000 and up to 100,000, more preferably greater than 30,000 and up to 100,000, and most preferably greater than 30,000 and up to 60,000. Also the crystalline polymer content in the mixture of the crystalline polymer and the polyurethane prepolymer is 5–90 wt %, preferably 5–80 wt % and more preferably 5–70 wt % of the mixture.

DETAILED DESCRIPTION OF THE INVENTION

The present invention will now be explained in detail. Although the following explanation concerns a moisture-curable hot-melt adhesive, the composition of the invention may also be effectively employed as a sealing material or coating material.

The moisture-curable hot-melt adhesive of the invention comprises a polyurethane prepolymer and a crystalline polymer obtained from monomer(s) containing at least one crystalline ethylenically unsaturated monomer with no active hydrogen as at least one part of the monomer.

The polyurethane prepolymer is a prepolymer with isocyanate groups on both ends which is obtained by condensation reaction between a polyol component and an isocyanate component, and is one which is commonly used for moisture-curable hot-melt adhesives.

Examples of usable polyols include polyester polyols obtained by ring-opening polymerization of a lactone such as ε-caprolactone, polyester polyols obtained from polyhydric alcohols and polybasic acids, polyether polyols such as polyethyleneoxide diol, polypropyleneoxide diol, polybutyleneoxide diol, polytetramethyleneoxide diol; aliphatic polyols such as hydrogenated polybutadiene diol and ethylenebutylene diol; polybutadiene diol; ethylene oxide addition product of bisphenol A, propylene oxide addition product of bisphenol A; ethylene oxide/propylene oxide addition product of bisphenol A, etc.

Examples of polyhydric alcohols which may be used in polyester polyols obtained from polyhydric alcohols and polybasic acids include ethylene glycol, 1,2-propylene glycol, 1,3-propylene glycol, 1,3-butylene glycol, 1,4-butylene glycol, neopentyl glycol, 1,8-octanediol, diethylene glycol, dipropylene glycol, cyclohexane-1,4-diol, glycerol etc. Examples of polybasic acids which may be used in polyester polyols obtained from polyhydric alcohols and polybasic acids include succinic acid, glutaric acid, adipic acid, pimelic acid, suberic acid, azelaic acid, sebacic acid, decanedioic acid, dodecanedioic acid, phthalic acid, isophthalic acid, terephthalic acid, trimellitic acid etc.

Examples of polyisocyanates which may be used include diphenylmethane-2,4'-diisocyanate, diphenylmethane-4,4'-diisocyanate, tolylene-2,4-diisocyanate, tolylene-2,6-diisocyanate, naphthalene-1,5-diisocyanate, triphenylmethane-4,4', 4"-triisocyanate, 1,4-phenylene diisocyanate, 4,4'-cyclohexylmethane diisocyanate, hexamethylene diisocyanate, isophorone diisocyanate, tetramethylxylene diisocyanate, xylene diisocyanate, etc.

A mixture of polyols may be used, and a mixture of polyisocyanates may be used.

Various adjuvants or other ingredients may be added to the adhesive composition of the invention to impart or modify particular characteristics. The adjuvants should be added only at a level that does not materially adversely interfere with the adhesion or cause premature curing of the composition. For examples, fillers (e.g., carbon black; fibers; glass, ceramic, metal or plastic bubbles; metal oxides such as zinc oxide; and minerals such as talc, clays, silica, silicates, and the like); tackifiers (non-reactive and/or reactive to polyisocyanates); plasticizers; antioxidants; pigments; UV absorbers; and adhesion promoters, and the like may be added to modify adhesion, strength build-up, tack, flexibility, etc.

Preparation of polyurethane prepolymers is well-known in the technical field, and thus will not be explained in this specification. According to the invention, the adhesive composition may be prepared by adding the isocyanate component after polymerizing the crystalline polymer in the polyol. Alternatively, the crystalline polymer may be mixed with the polyol component and then the isocyanate component added to this mixture to make the adhesive composition. The molecular weight of the polyurethane prepolymer used in the invention may be varied by changing the ratio of isocyanate equivalent to equivalent of total functional groups containing active hydrogens (usually hydroxyl equivalent), with the ratio being generally 1.1 to 2.5. When the ratio is smaller than 1.1, the molecular weight is excessively high, melt viscosity is significantly increased. When the ratio is larger than 2.5, the amount of unreacted isocyanate is excessively high, causing the problem of stability. This ratio (isocyanate equivalent/equivalent of functional groups containing active hydrogen) is preferably 1.2 to 2.2, and more preferably 1.2 to 2.0.

According to the invention, addition of the crystalline polymer to the polyurethane prepolymer in the composition increases the initial impact strength and final strength of the moisture-curable hot-melt adhesive while also lowering the melt viscosity.

The crystalline polymer is one obtained by polymerization of monomer(s) containing at least one crystalline ethylenically unsaturated monomer with no active hydrogen. The monomers used to make the crystalline polymer may contain, in addition to the crystalline monomer, an amorphous ethylenically unsaturated monomer with no active hydrogen.

The term "amorphous" means that the material does not exhibit a measurable melting point (Tm) although such a material is not required to be 100% amorphous.

The crystalline polymer is defined here as a polymer with a melting point of 15°–135° C. When the melting point of the polymer is below 15° C., sufficient crystallinity at room temperature cannot be obtained. When the melting point of the polymer is above 135° C., the adhesive composition comprising the crystalline polymer and a polyurethane prepolymer needs to be melted at above 135° C. in order to get a uniform mixture. This may lead to viscosity increase due to side reaction and/or decomposition of the adhesive composition. The melting point of the crystalline polymer is preferably 20°–120° C., and more preferably 25°–100° C.

Examples of crystalline ethylenically unsaturated monomers with no active hydrogen include (meth)acrylate esters of non-tertiary alcohols, the alkyl portions of which comprise 16 or more carbon atoms, and (meth)acrylate esters of monools containing polyalkylene oxide units, wherein the alkylene portion of the polyalkylene oxide unit contains 2 or more carbon atoms.

Examples of (meth)acrylate esters of non-tertiary alcohols, the alkyl portions of which comprise 16 or more carbon atoms, include, but are not restricted to, hexadecyl (meth)acrylate, octadecyl (meth)acrylate, eicosanyl (meth)acrylate, behenyl acrylate, behenyl methacrylate (for example, Blenmer VMA, product of Nippon Oil & Fats Co.), hexacosanyl (meth)acrylate, Unilin X-5100 (acrylate ester of alkyl alcohol, the alkyl portion of which comprises 28–35 carbon atoms, product of Petrolite Corp.), Unilin X-5112 (acrylate ester of alkyl alcohol, the alkyl portion of which comprises 36–44 carbon atoms, product of Petrolite Corp.), and Unilin X-5113 (acrylate ester of alkyl alcohol, the alkyl portion of which comprises 46–53 carbon atoms, product of Petrolite Corp.).

Examples of (meth)acrylate esters of monools containing polyalkylene oxide units, wherein the alkylene portion of the polyalkylene oxide unit contains 2 or more carbon atoms, include, but are not restricted to, methoxypolyethylene glycol methacrylate (for example, NK ester M-230G, product of Shin-Nakamura Chemical Industries), Unithox X-5141 (Petrolite Corp.) and Unithox X-5142 (Petrolite Corp.). Unithox X-5141 and Unithox X-5142 are acrylic acid esters containing a polyethylene glycol portion and a polymethylene portion, and are generally represented by the structural formula:

$$CH_2=CH-COO-(CH_2CH_2O)_x-(CH_2)_y-CH_3,$$

wherein $1 \leq x \leq 50$, $27 \leq y \leq 53$.

A combination of different crystalline monomers may be used.

Amorphous monomers which may be used together with the crystalline monomer to form the crystalline polymer are ethylenically unsaturated monomers with no active hydrogen. More specifically, the amorphous monomers to be used according to the invention include any (meth)acrylate esters except for (meth)acrylate esters of non-tertiary alcohols, the alkyl portions of which comprise 16 or more carbon atoms (i.e. crystalline monomers) (in other words, (meth)acrylate esters of non-tertiary alcohols, the alkyl portions of which comprise no more than 15 carbon atoms, as well as (meth)acrylate esters of any alcohol other than alkyl alcohols (in which case the number of carbon atoms of the alcohol is not limited)), and further include vinyl esters, vinyl ethers, alkyl acrylamides, styrene, acrylonitrile, N-vinyllactams, vinylidene chloride, vinyltoluene, etc.

Examples of amorphous (meth)acrylate esters include (meth)acrylate esters of alkyl alcohols, the alkyl portions of which comprise no more than 15 carbon atoms, such as methyl (meth)acrylate, ethyl (meth)acrylate, butyl (meth)acrylate, 2-ethylhexyl (meth)acrylate, isooctyl (meth)acrylate, and lauryl (meth)acrylate, and (meth)acrylate esters of alcohols other than alkyl alcohols such as isobornyl (meth)acrylate, 2-phenoxyethyl (meth)acrylate, tetrafurfuryl (meth)acrylate, abitol acrylate, and dicyclopentadienyl (meth)acrylate, but the amorphous (meth)acrylate esters are not limited to these.

Examples of vinyl esters to be used as amorphous monomers include vinyl propionate, vinyl acetate, vinyl pivalate, vinyl neononanoate, vinyl-2-ethyl hexanoate and vinyl neododecanoate. Examples of alkyl acrylamides include N,N-dimethylacrylamide and N,N-diethylacrylamide. Examples of N-vinyllactams include N-vinylpyrrolidone and N-vinylcaprolactam.

For amorphous monomers, it is possible to use a combination of different monomers.

According to the invention, it has been found that using a crystalline polymer obtained from a monomer containing an alkylacrylamide such as dimethylacrylamide or diethylacrylamide particularly decreases the melt viscosity of the moisture-curable hot-melt adhesive, while also providing excellent initial impact strength and extremely high final strength after curing. In most cases, the alkyl acrylamide is preferably present in the monomer mixture at 5–70 wt %. If the alkyl acrylamide content is less than 5 wt %, the effects on lowered melt viscosity, and improved initial impact strength and shear strength are small, and the content of greater than 70 wt % causes increased melt viscosity. A more preferred range for the alkyl acrylamide is 5–60 wt %.

The crystalline polymer obtained by polymerization of the crystalline monomer has notably improved compatibility with the polyol in the polyurethane prepolymer. The improved compatibility with the polyol means improved compatibility with the polyurethane prepolymer prepared from the polyol, and thus improvement in the characteristics of the adhesive of the invention may be expected. Also, when the crystalline polymer obtained from the crystalline monomer is mixed with the polyol which is the starting material for the polyurethane prepolymer, the mixture has a lower melt viscosity compared to mixtures of amorphous polymers prepared from amorphous monomers. A lower melt viscosity of the polyol dissolving the polymer means that the melt viscosity of the composition containing the polymer mixed with the prepolymer prepared from that polyol will be lower than the melt viscosity of compositions containing amorphous polymers. The hot-melt adhesive is coated on the adherend while molten and immediately hardens upon cooling, and therefore the lower melt viscosity results in easier penetration of the adhesive into the fine irregularities on the surface of the adherend; thus, a low melt viscosity is very advantageous for improving the adhesive properties of the hot-melt adhesive.

The crystalline monomer may constitute 5–100 wt % of the monomer mixture. When a monomer mixture containing less than 5 wt % of a crystalline monomer is used, the compatibility of the resulting polymer with the polyol for the polyurethane prepolymer is lowered, which means lower compatibility with the polyurethane prepolymer itself. According to the invention, the monomer mixture may contain 100 wt % crystalline monomer(s), although the adhesive tends to be brittle in such cases. Consequently, depending on the use, the polymer used is preferably prepared from a monomer mixture containing an amorphous monomer in addition to the crystalline monomer. The crystalline monomer content of the monomer starting substance is preferably 10–90 wt %, and more preferably 30–80 wt %.

The weight average molecular weight of the crystalline polymer may be from 5,000 to 100,000. Crystalline polymers with weight average molecular weights of less than 5,000 provide less initial impact strength for the moisture-curable hot-melt adhesives to which they are added. When the weight average molecule of the crystalline polymer is greater than 100,000 the melt viscosity is increased, thus impairing the usefulness of the adhesive. The crystalline polymer preferably has a weight average molecular weight of greater than 10,000 and up to 100,000, more preferably greater than 30,000 and up to 100,000, and most preferably greater than 30,000 and up to 60,000.

The amount of the crystalline polymer present in the mixture of the crystalline polymer and a polyurethane prepolymer may be 5–90 wt %. When the crystalline polymer content is less than 5 wt %, less initial impact strength is provided for the moisture-curable hot-melt adhesive. When the crystalline polymer content is greater than 90 wt %, the heat resistance of the adhesive after curing is lowered. The initial impact strength, final strength and melt viscosity of the moisture-curable hot-melt adhesive of the invention appear to be more greatly balanced when the crystalline polymer content is at the lower end of the ranges specified above. A preferred crystalline polymer content is 5–80 wt %, with 5–70 wt % being more preferred.

The crystalline polymer to be used according to the invention may be synthesized by radical, anionic or cationic polymerization of the monomers comprising the crystalline monomer and the amorphous monomer, although synthesis by radical polymerization is preferred for ease of reaction with a greater variety of usable monomers. The initiator for the radical polymerization may be a thermal initiator which generates radicals by heat, or a photoinitiator which generates radicals by light.

Examples of thermal initiators which may be used include azo compounds such as 2,2'-azobis(2,4-dimethylvaleronitrile), 2,2'-azobisisobutyronitrile, 2,2'-azobis(2-methylbutyronitrile), 1,1'-azobis(1-cyclohexane-1-carbonylnitrile) and dimethyl-2,2'-azoisobutyrate, as well as peroxides such as benzoyl peroxide, lauroyl peroxide and t-butyl peroxypivalate.

Examples of photoinitiators which may be used include benzoin ethers such as benzoin methyl ether and benzoin butyl ether, acetophenone derivatives such as 2,2-dimethoxy-2-phenylacetophenone and 2,2-diethoxyacetophenone, and acylphosphine oxide and acylphosphonate derivatives such as diphenyl-2,4,6-trimethylbenzoylphosphine oxide, isopropoxy(phenyl)-2,4,6-trimethylbenzoylphosphine oxide and dimethylpivaloylphosphonate.

A chain transfer agent may also be used during synthesis of the crystalline polymer to adjust the polymer molecular weight. Chain transfer agents which may be used are mercapto compounds such as dodecylmercaptan and halogen compounds such as carbon tetrabromide.

The moisture-curable hot-melt adhesive of the invention may be easily produced by combination of various well-known techniques. For example, a moisture-curable hot-melt adhesive according to the invention may be produced by first preparing the crystalline polymer, mixing the polymer with the polyol component which is to serve as the polyurethane prepolymer raw material, and then adding an isocyanate component to the mixture for reaction with the polyol component. Alternatively, a moisture-curable hot-melt adhesive according to the invention may be produced by polymerizing the starting monomer in the polyol component which is to be the polyurethane prepolymer raw material to synthesize the crystalline polymer, and then adding an isocyanate component to the mixture for reaction with the polyol to make the polyurethane prepolymer. Yet another alternative method of producing a moisture-curable hot-melt adhesive according to the invention involves preparing the crystalline polymer and polyurethane prepolymer each separately, and then mixing them together. A few of these methods are explained by way of the following examples.

EXAMPLES

The present invention will now be explained in further detail by way of the following examples. These examples are provided as illustration of the invention and are in no way intended to be restrictive.

The abbreviations used in the examples are the following.
VMA: behenyl methacrylate (crystalline monomer, product of
Nippon Oil & Fats Co.)

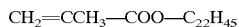

BMA: n-butyl methacrylate (amorphous monomer)
MMA: methyl methacrylate (amorphous monomer)
IOA: isooctyl acrylate (amorphous monomer)
DMAA: N,N-dimethylacrylamide (amorphous monomer)
DEAA: N,N-diethylacrylamide (amorphous monomer)
DM: n-dodecylmercaptan
V-65: 2,2'-azobis(2,4-dimethylvaleronitrile) (product of Wako Pure Chemical Industries Co.)
Mw: weight average molecular weight
Mn: number average molecular weight
Mw/Mn: ratio of weight average molecular weight to number average molecular weight
Tm: melting point
Sannix PP1000: polypropylene glycol with hydroxyl value of 111 (product of Sanyo Chemical Industries)
Rucoflex S105-30: Poly(hexamethylene adipate)diol with hydroxyl value of 29.3 (product of Ruco Polymer Co.)
Millionate MT-F: 4,4'-diphenylmethane diisocyanate (MDI) (product of Nippon Polyurethane Industries)
DMDEE: dimorpholino diethyl ether (product of Huntsman Co.)
NCO/OH ratio: Equivalent ratio of isocyanate to hydroxyl groups The various properties of the crystalline polymers were tested in the following manner.

The weight average molecular weight (Mw) and number average molecular weight (Mn) were measured by gel permeation chromatography (GPC). Tetrahydrofuran was used as the solvent to obtain a molecular weight with polystyrene as the standard. The GPC method is described in detail in Modern Size Exclusion Liquid Chromatography, Practice of Gel Permeation Chromatography, John Wiley & Sons.

The melting point (Tm) was measured using a differential scanning calorimeter (DSC) (Perkin Elmer 2C) at a temperature-elevating rate of 10° C./min. DSC is described in detail in Thermal Characterization of Polymeric Materials, Academic Press, New York.

In Examples 1–4 described below, the polymers were prepared by the following general preparation of acrylic polymers. Specifically, a monomer (total weight: 30 grams) DM (chain transfer agent) and V-65 (initiator) were placed in a heat-resistant glass bottle (product of Schott Glaswerke) and nitrogen gas was introduced for 15 minutes. The glass bottle was then totally sealed and tumbled in a constant temperature bath (TAIYO Thermo Unit T-368) at 60° C. for 4 hours for polymerization.

Example 1

This example concerns preparation of amorphous polymers.

Amorphous polymers were synthesized using 64.0 parts by weight BMA and 36.0 parts by weight MMA as amorphous monomers. The amount of the polymerization initiator V-65 was consistently 0.20 part by weight while the amount of the chain transfer agent DM was varied as shown in Table 1, to obtain amorphous polymers 1–5 having different molecular weights. The molecular weights of the synthesized polymers were then measured. The polymers had no melting point as measured by DSC. The results are summarized in Table 1.

TABLE 1

|  | Polymer 1 | Polymer 2 | Polymer 3 | Polymer 4 | Polymer 5 |
| --- | --- | --- | --- | --- | --- |
| BMA (monomer) | 64.00 | 64.00 | 64.00 | 64.00 | 64.00 |
| MMA (monomer) | 36.00 | 36.00 | 36.00 | 36.00 | 36.00 |
| DM (chain transfer agent) | 0.10 | 0.30 | 0.50 | 1.00 | 1.50 |
| V-65 (initiator) | 0.20 | 0.20 | 0.20 | 0.20 | 0.20 |
| Polymer type | amorphous | amorphous | amorphous | amorphous | amorphous |
| Mw | 214000 | 91200 | 57300 | 31400 | 22500 |
| Mn | 95000 | 43200 | 28200 | 16000 | 11600 |
| Mw/Mn | 2.25 | 2.11 | 2.04 | 1.96 | 1.94 |
| Tm (°C.) | — | — | — | — | — |

Example 2

This example concerns preparation of crystalline polymers.

The general preparation of acrylic polymers described above was used to prepare crystalline polymers from a monomer mixture comprising 50.0 parts by weight VMA (crystalline monomer), 32.0 parts by weight BMA and 18.0 parts by weight MMA. The amount of the initiator V-65 was consistently 0.20 part by weight, while the amount of DM was varied as shown in Table 2, to synthesize crystalline polymers 6–11 having different molecular weights. The molecular weights and melting points of the polymers were then measured. The results are summarized in Table 2.

TABLE 2

|  | Polymer 6 | Polymer 7 | Polymer 8 | Polymer 9 | Polymer 10 | Polymer 11 |
| --- | --- | --- | --- | --- | --- | --- |
| VMA (crystalline monomer) | 50.00 | 50.00 | 50.00 | 50.00 | 50.00 | 50.00 |
| BMA (monomer) | 32.00 | 32.00 | 32.00 | 32.00 | 32.00 | 32.00 |

TABLE 2-continued

|  | Polymer 6 | Polymer 7 | Polymer 8 | Polymer 9 | Polymer 10 | Polymer 11 |
|---|---|---|---|---|---|---|
| MMA (monomer) | 18.00 | 18.00 | 18.00 | 18.00 | 18.00 | 18.00 |
| DM (chain transfer agent) | 0.10 | 0.30 | 0.50 | 1.00 | 1.50 | 3.00 |
| V-65 (initiator) | 0.20 | 0.20 | 0.20 | 0.20 | 0.20 | 0.20 |
| BMA/MMA ratio | 64/36 | 64/36 | 64/36 | 64/36 | 64/36 | 64/36 |
| Polymer type | crystalline | crystalline | crystalline | crystalline | crystalline | crystalline |
| Mw | 211000 | 113000 | 63300 | 32800 | 23400 | 13000 |
| Mn | 102000 | 58000 | 29700 | 17300 | 13320 | 7600 |
| Mw/Mn | 2.07 | 1.95 | 2.13 | 1.90 | 1.76 | 1.71 |
| Tm (°C.) | 34 | 36 | 34 | 39 | 38 | 40 |

Example 3

The general preparation of acrylic polymers described above was also used in this example to prepare crystalline polymers, except that the BMA/MMA ratio of the amorphous monomer was consistently 64/36 as in Examples 1 and 2, while the amount of crystalline monomer VMA was varied, as shown in Table 3. The amounts of DM and V-65 were kept constant. The amounts of each component and the molecular weights and melting points of the resulting crystalline polymers 12–17 are summarized in Table 3.

Monomer mixture containing DMAA and DEAA as amorphous alkyl acrylamide monomers in the amounts shown in Table 4 were made to prepare crystalline polymers according to the general preparation of acrylic polymers described above. As shown in Table 4, the amount of the polymerization initiator V-65 was kept constant, while the amount of the chain transfer agent DM was varied to prepare crystalline polymers 18–23 with different molecular weights. The molecular weights and melting points of the polymers are summarized in Table 4.

TABLE 3

|  | Polymer 12 | Polymer 13 | Polymer 14 | Polymer 15 | Polymer 16 | Polymer 17 |
|---|---|---|---|---|---|---|
| VMA (crystalline monomer) | 80.00 | 70.00 | 60.00 | 50.00 | 40.00 | 30.00 |
| BMA (monomer) | 12.80 | 19.20 | 25.60 | 32.00 | 38.00 | 44.80 |
| MMA (monomer) | 7.20 | 10.80 | 14.40 | 18.00 | 21.60 | 25.20 |
| DM (chain transfer agent) | 1.00 | 1.00 | 1.00 | 1.00 | 1.00 | 1.00 |
| V-65 (initiator) | 0.20 | 0.20 | 0.20 | 0.20 | 0.20 | 0.20 |
| BMA/MMA ratio | 64/36 | 64/36 | 64/36 | 64/36 | 64/36 | 64/36 |
| Polymer type | crystalline | crystalline | crystalline | crystalline | crystalline | crystalline |
| Mw | 29600 | 31600 | 33400 | 32800 | 34100 | 34000 |
| Mn | 16700 | 17800 | 18500 | 17300 | 16500 | 16300 |
| Mw/Mn | 1.77 | 1.78 | 1.80 | 1.90 | 2.06 | 2.08 |
| Tm (°C.) | 53 | 51 | 44 | 39 | 30 | 25 |

TABLE 4

|  | Polymer 18 | Polymer 19 | Polymer 20 | Polymer 21 | Polymer 22 | Polymer 23 |
|---|---|---|---|---|---|---|
| VMA (crystalline monomer) | 50.00 | 50.00 | 50.00 | 50.00 | 50.00 | 50.00 |
| IOA (monomer) | 10.25 | 10.25 | 10.25 | 10.25 | 10.42 | 10.42 |
| DMMA (monomer) | 39.75 | 39.75 | 39.75 | 39.75 | 0 | 0 |
| DEAA (monomer) | 0 | 0 | 0 | 0 | 39.58 | 39.58 |
| DM (chain transfer agent) | 1.20 | 1.60 | 2.00 | 2.50 | 2.00 | 2.50 |
| V-65 (initiator) | 0.20 | 0.20 | 0.20 | 0.20 | 0.20 | 0.20 |
| Polymer type | crystalline | crystalline | crystalline | crystalline | crystalline | crystalline |
| Mw | 56600 | 42700 | 36400 | 28700 | 59900 | 50700 |
| Mn | 15000 | 12100 | 10000 | 8174 | 9700 | 8000 |
| Mw/Mn | 3.77 | 3.54 | 3.64 | 3.51 | 6.17 | 6.34 |
| Tm (°C.) | 47 | 46 | 47 | 48 | 45 | 45 |

Example 4

This example concerns crystalline polymers prepared from monomer starting substances containing alkyl acrylamides.

Example 5

This example concerns polymerization of crystalline polymers in a polyol as the polyurethane prepolymer starting material. The monomers (total weight: 31.97 grams), Sannix PP1000 (polypropylene glycol, 11.51 grams), DM (chain transfer agent) and V-65 (initiator) were placed in a heat-resistant glass bottle (product of Schott Glaswerke) and nitrogen gas was introduced for 15 minutes. The glass bottle was then totally sealed and tumbled in a constant temperature bath (TAIYO Thermo Unit T-368) at 60° C. for 6 hours for polymerization. The compositions of the monomer starting substances and the molecular weights and melting points of the resulting crystalline polymers 24–27 are summarized in Table 5.

TABLE 5

|  | Polymer 24 | Polymer 25 | Polymer 26 | Polymer 27 |
|---|---|---|---|---|
| VMA (crystalline monomer) | 0.00 | 50.00 | 30.00 | 50.00 |
| BMA (monomer) | 64.00 | 32.00 | 44.88 | 0.00 |
| IOA (monomer) | 0.00 | 0.00 | 0.00 | 10.25 |
| MMA (monomer) | 36.00 | 18.00 | 25.20 | 0.00 |
| DMMA (monomer) | 0.00 | 0.00 | 0.00 | 39.75 |
| Sannix PP1000 (polypropylene glycol) | 25.12 | 25.12 | 25.12 | 25.12 |
| DM (chain transfer agent) | 1.00 | 1.00 | 1.00 | 1.00 |
| V-65 (initiator) | 0.20 | 0.20 | 0.20 | 0.20 |
| Polymer type | amorphous | crystalline | crystalline | crystalline |
| Mw* | 37100 | 37100 | 37300 | 53200 |
| Mn* | 18300 | 19400 | 18900 | 20200 |
| Mw/Mn | 2.02 | 1.90 | 1.98 | 2.64 |

*Molecular weight of polymer alone (without polypropylene glycol)

Example 6

Some of the amorphous polymers and crystalline polymers synthesized above were evaluated for compatibility with a polyol.

The amorphous polymer or crystalline polymer was placed in a small metal container with Sannix PP1000 (polypropylene glycol), and the container was heated on a hot plate at 120° C. for 2 hours, after which the contents were thoroughly stirred. Samples with weight ratios of the amorphous polymers or crystalline polymers to Sannix PP1000 of 1/9, 1/3 and 1/1 were each tested. The stirred samples were observed for solubility and uniformity of mixture of the polymers with the polyol. The results are summarized in Table 6.

TABLE 6

| Polymer type | Polymer/Sannix = 1/9 | Polymer/Sannix = 1/3 | Polymer/Sannix = 1/1 |
|---|---|---|---|
| Polymer 1 (amorphous polymer) (VMA % = 0, Mw = 214000) | insoluble, non-uniform | insoluble, non-uniform | insoluble, non-uniform |
| Polymer 3 (amorphous polymer) (VMA % = 0, Mw = 57300) | insoluble, non-uniform | insoluble, non-uniform | insoluble, non-uniform |
| Polymer 4 (amorphous polymer) (VMA % = 0, Mw = 31400) | barely soluble, non-uniform | barely soluble, non-uniform | barely soluble, non-uniform |
| Polymer 5 (amorphous polymer) (VMA % = 0, Mw = 22500) | slightly soluble, non-uniform | barely soluble, non-uniform | barely soluble, non-uniform |
| Polymer 6 (crystalline polymer) (VMA % = 50, Mw = 211000) | polymer swollen, uniform | polymer swollen, uniform | polymer swollen, uniform |
| Polymer 7 (crystalline polymer) (VMA % = 50, Mw = 113000) | soluble, uniform | soluble, uniform | soluble, uniform |
| Polymer 8 (crystalline polymer) (VMA % = 50, Mw = 63300) | soluble, uniform | soluble, uniform | soluble, uniform |
| Polymer 9 (crystalline polymer) (VMA % = 50, Mw = 32800) | soluble, uniform | soluble, uniform | soluble, uniform |
| Polymer 10 (crystalline polymer) (VMA % = 50, Mw = 23400) | soluble, uniform | soluble, uniform | soluble, uniform |
| Polymer 11 (crystalline polymer) (VMA % = 50, Mw = 13000) | soluble, uniform | soluble, uniform | soluble, uniform |
| Polymer 17 (crystalline polymer) (VMA % = 30, Mw = 34000) | soluble, uniform | soluble, uniform | soluble, uniform |
| Polymer 12 (crystalline polymer) (VMA % = 80, Mw = 29600) | soluble, uniform | soluble, uniform | soluble, uniform |

The amorphous polymers obtained using BMA and MMA as the monomers, even with low molecular weights (for example, Mw=30,000 or lower) dissolve only barely or not at all in polypropylene glycol, but the crystalline polymers prepared from monomers containing VMA as the crystalline monomer in addition to BMA and MMA dissolve readily in polypropylene glycol even with high molecular weights (for example, 100,000 or higher). Since polypropylene glycol is very commonly used to produce polyurethanes, the use of crystalline polymers is very advantageous compared to amorphous polymers for producing polyurethanes.

Example 7

The example which follows concerns production of moisture-curable hot-melt adhesives, a method of evaluating them, and the results of the evaluation.

The melt viscosities of the moisture-curable hot-melt adhesives were measured using a Brookfield melt viscometer. The spindle used was a #27, and the measuring temperature was 121° C.

The initial strengths of the moisture-curable hot-melt adhesives were measured using a pendulum-type impact tester described in JIS K 6855 (which corresponds to ASTM D 950). The adhesive was coated on the 12.5×25 mm surface of a 12.5×25×10 mm birch wood material (coating temperature: 120° C.), immediately after which it was sprinkled with glass beads with sizes from 0.08–0.13 mm and adhered to a 12.5×45×45 mm birch wood material. The test piece was compressed by hand, and the squeezed adhesive was removed. The impact strength was measured 1 minute after adhesion. The data was recorded as the average of measurement results for 5 test pieces.

The shear adhesive strength was measured according to JIS K 6851. The adhesive was applied at both ends of a 2.5×10×0.5 cm birch wood panel at 120° C., immediately after which it was sprinkled with glass beads with sizes from 0.08–0.13 mm and adhered to another birch wood panel of the same size with an adhesion area of 3.125 cm² while compressing by hand. The adhesion test piece was conditioned at 250° C., 50% relative humidity for 7 days, and then the strength was measured with a tensile tester at a tension rate of 50 mm/min. The data was recorded as the average of measurement results for 3 test pieces.

The adhesive samples in the following examples were prepared according to the following general preparation of moisture-curable hot-melt adhesives. That is, a polyol as the polyurethane material and a pre-prepared polymer (either amorphous or crystalline) were degassed and dried for 4 hours at 120° C. under vacuum prior to use. The polyol and polymer were then transferred to a 100 ml open-top reactor while still molten, and the isocyanate component Millionate MT-F (4,4'-diphenylmethane diisocyanate (MDI)) and the catalyst DMDEE were added and mixed therewith by vigorous stirring for 3 minutes at 120° C. under dry nitrogen. The reactor was then placed in a vacuum oven for heating and degassing for 30 minutes at 120° C. under vacuum. After the heating and degassing were complete, the contents of the reactor were poured into a metal container (tube) which was then sealed. The container was kept in a desiccator at room temperature. The contents of the container (adhesives) were heated in the container at 120° C. for 2 hours prior to being used in a molten state.

Some of the polymers prepared previously were combined with the polyurethane prepolymer components by the general preparation of moisture-curable hot-melt adhesives described above in the proportions listed in Table 7, to make moisture-curable hot-melt adhesives. Since the amorphous polymers did not dissolve in polyols as demonstrated in Example 6, the adhesives were prepared by the following procedure.

1) A polyurethane prepolymer comprising 58.68 parts by weight of Rucoflex S105-30, 25.15 parts by weight of Sannix PP1000, 16.08 parts by weight of Millionate MT-F and 0.10 part by weight of DMDEE was prepared based on the above-mentioned general preparation of moisture-curable hot-melt adhesives. (An amorphous polymer was not added.) The polyurethane prepolymer prepared in this manner will be referred to as prepolymer A.

2) Thirty grams of polymer 4 (amorphous polymer) was dissolved in MEK (solid portion: 48.8%). The solution will be referred to as solution B.

3) Twenty grams of prepolymer A and 40.98 grams of solution B were combined and mixed by stirring to uniformity at room temperature.

4) The resulting mixture was placed in a vacuum oven and the MEK was totally removed at 120° C. under vacuum. The resulting final product will be referred to as adhesive C1. This adhesive was used for comparison.

The compositions of the adhesives prepared in this manner are listed in Table 7. The results of measuring the melt viscosities, initial impact strengths and overlap shear adhesive strengths of the adhesives are also summarized in Table 7. Adhesives 1–9 are the adhesives according to the invention.

TABLE 7

| | Adhesive | | | | | | | | | |
|---|---|---|---|---|---|---|---|---|---|---|
| | C1 | 1 | 2 | 3 | 4 | 5 | 6 | 7 | 8 | 9 |
| Polymer 4 (amorphous polymer) (VMA = 0%, Mw = 31400) | 50.0 | 0.00 | 0.00 | 0.00 | 0.00 | 0.00 | 0.00 | 0.00 | 0.00 | 0.00 |
| Polymer 9 (crystalline polymer) (VMA = 50%, Mw = 32800 | 0.00 | 50.00 | 0.00 | 0.00 | 0.00 | 0.00 | 0.00 | 0.00 | 10.00 | 80.00 |
| Polymer 17 (crystalline polymer) (VMA = 30%, Mw = 34000) | 0.00 | 0.00 | 50.00 | 0.00 | 0.00 | 0.00 | 0.00 | 0.00 | 0.00 | 0.00 |
| Polymer 8 (crystalline polymer) (VMA = 50%, Mw = 63300) | 0.00 | 0.00 | 0.00 | 50.00 | 0.00 | 0.00 | 0.00 | 0.00 | 0.00 | 0.00 |
| Polymer 20 (crystalline polymer*) (VMA = 50%, Mw = 36400) | 0.00 | 0.00 | 0.00 | 0.00 | 50.00 | 0.00 | 0.00 | 0.00 | 0.00 | 0.00 |
| Polymer 23 (crystalline polymer*) (VMA = 50%, Mw = 50700) | 0.00 | 0.00 | 0.00 | 0.00 | 0.00 | 50.00 | 0.00 | 0.00 | 0.00 | 0.00 |
| Polymer 12 (crystalline polymer) (VMA = 80%, Mw = 29600) | 0.00 | 0.00 | 0.00 | 0.00 | 0.00 | 0.00 | 50.00 | 0.00 | 0.00 | 0.00 |
| Polymer 11 (crystalline polymer) (VMA = 50%, Mw = 1300) | 0.00 | 0.00 | 0.00 | 0.00 | 0.00 | 0.00 | 0.00 | 50.00 | 0.00 | 0.00 |
| Rucoflex S105-30 | 29.31 | 29.31 | 29.31 | 29.31 | 29.31 | 29.31 | 29.31 | 29.31 | 52.80 | 11.69 |
| Sannix PP1000 | 12.56 | 12.56 | 12.56 | 12.56 | 12.56 | 12.56 | 12.56 | 12.56 | 22.63 | 5.01 |
| Millionate MT-F | 8.03 | 8.03 | 8.03 | 8.03 | 8.03 | 8.03 | 8.03 | 8.03 | 14.47 | 3.20 |
| DMDEE | 0.10 | 0.10 | 0.10 | 0.10 | 0.10 | 0.10 | 0.10 | 0.10 | 0.10 | 0.10 |
| NCO/OH ratio | 1.6 | 1.6 | 1.6 | 1.6 | 1.6 | 1.6 | 1.6 | 1.6 | 1.6 | 1.6 |
| Polymer/polyurethane prepolymer ratio | 50/50 | 50/50 | 50/50 | 50/50 | 50/50 | 50/50 | 50/50 | 50/50 | 10/90 | 80/20 |

TABLE 7-continued

|  | Adhesive | | | | | | | | | |
|---|---|---|---|---|---|---|---|---|---|---|
|  | C1 | 1 | 2 | 3 | 4 | 5 | 6 | 7 | 8 | 9 |
| Melt viscosity (cP) 121° C. | 179000 | 9350 | 45100 | 25400 | 6910 | 3340 | 2160 | 3500 | 9410 | 7260 |
| Initial impact strength (kg · cm) | 3.5 | 15.5 | 10.5 | 15.6 | 14.5 | 23.0 | 5.1 | 21.8 | 18.0 | 29.2 |
| Overlap shear adhesive strength (kg/cm$^2$) | 28.0 | 33.9 | 43.7 | 41.6 | 44.0 | 40.3 | 15.2 | 36.0 | 78.7 | 33.3 |

*Crystalline polymer containing alkyl acrylamide

The mixture of the polyurethane prepolymer and amorphous polymer (adhesive C1) had a very high melt viscosity. Such a viscosity is not suitable for application of adhesives with common applicators. Adhesive C1 also had inadequate initial impact strength. In contrast, the mixtures of the polyurethane prepolymer and crystalline polymers (adhesives 1–9) had both high initial impact strength and shear adhesive strength, with low melt viscosities. Of adhesives 1–9 according to the invention, those containing crystalline polymers comprising alkyl acrylamides (adhesives 4 and 5) had very high initial impact strength and shear adhesive strength, with very low melt viscosities.

Example 8

In this example, moisture-curable hot-melt adhesives were prepared using polymers made by polymerization in polypropylene glycol.

A 62.56 part by weight portion of the polymer polymerized in polypropylene glycol (polymers 24–27 described in Example 5) (of which 50 parts by weight was the polymer and the remaining 12.56 parts by weight was polypropylene glycol) and 29.31 parts by weight of Rucoflex S105-30 were placed in an open-top reactor, and heated to dryness for 4 hours at 120° C. under vacuum in a vacuum oven. After next adding 8.03 parts by weight of Millionate MT-F and 0.10 part by weight of DMDEE, the mixture was stirred for 3 minutes at 120° C. under nitrogen. The reaction was again placed in the vacuum oven and heated for 30 minutes at 120° C. under vacuum for heating and degassing. The contents of the reactor were poured into a metal container (tube) which was then sealed. The container was kept in a desiccator at room temperature. The contents of the container (adhesive) were heated for two hours in the container for complete reaction prior to use.

The compositions and properties of the adhesives prepared in this manner are listed in Tables 8 and 9. Adhesive C2 is a comparative adhesive using polymer 24 (amorphous polymer), and adhesives 10–12 are adhesives according to the invention.

TABLE 8

|  | Adhesive C2 | Adhesive 10 | Adhesive 11 | Adhesive 12 |
|---|---|---|---|---|
| Polymer 24 (amorphous polymer + PPG*) | 62.56 | 0.00 | 0.00 | 0.00 |
| Polymer 25 (crystalline polymer + PPG*) | 0.00 | 62.56 | 0.00 | 0.00 |
| Polymer 26 (crystalline polymer + PPG*) | 0.00 | 0.00 | 62.56 | 0.00 |
| Polymer 27 (crystalline polymer** + PPG*) | 0.00 | 0.00 | 0.00 | 62.56 |
| Rucoflex S105-30 | 29.31 | 29.31 | 29.31 | 29.31 |
| Millionate MT-F | 8.03 | 8.03 | 8.03 | 8.03 |
| DMDEE | 0.10 | 0.10 | 0.10 | 0.10 |

TABLE 8-continued

|  | Adhesive C2 | Adhesive 10 | Adhesive 11 | Adhesive 12 |
|---|---|---|---|---|
| NCO/OH ratio | 1.6 | 1.6 | 1.6 | 1.6 |
| Polymer/polyurethane prepolymer ratio | 50/50 | 50/50 | 50/50 | 50/50 |

*Polypropylene glycol
**Crystalline polymer containing alkyl acrylamide

TABLE 9

|  | Adhesive C2 | Adhesive 10 | Adhesive 11 | Adhesive 12 |
|---|---|---|---|---|
| BMA/MMA polymer (amorphous polymer) VMA = 0%, Mw = 37100 | 50.00 | 0.00 | 0.00 | 0.00 |
| VMA/BMA/MMA polymer (crystalline polymer) VMA = 50%, Mw = 37100 | 0.00 | 50.00 | 0.00 | 0.00 |
| VMA/BMA/MMA polymer (crystalline polymer) VMA = 30%, Mw = 37300 | 0.00 | 0.00 | 50.00 | 0.00 |
| VMA/IOA/DMAA polymer (crystalline polymer) VMA = 50%, Mw = 53200 | 0.00 | 0.00 | 0.00 | 50.00 |
| Rucoflex S105-30 | 29.31 | 29.31 | 29.31 | 29.31 |
| Sannix PP1000 | 12.56 | 12.56 | 12.56 | 12.56 |
| Millionate MT-F | 8.03 | 8.03 | 8.03 | 8.03 |
| DMDEE | 0.10 | 0.10 | 0.10 | 0.10 |
| NCO/OH ratio | 1.6 | 1.6 | 1.6 | 1.6 |
| Polymer/polyurethane prepolymer ratio | 50/50 | 50/50 | 50/50 | 50/50 |
| Melt viscosity (cP) 121° C. | >500000* | 16080 | 46000 | 15950 |
| Initial impact strength (kg · cm) | 2.2 | 21.5 | 8.0 | 20.0 |
| Overlap shear adhesive strength (kg/cm$^2$) | 28.8 | 34.4 | 42.9 | 60.0 |

*Beyond the maximum measurable value of the melt viscometer

The mixture of the polyurethane prepolymer and amorphous polymer (adhesive C2) had low initial impact strength and a very high melt viscosity. Such a high viscosity results in extreme difficulty in applying the hot-melt adhesive to adherends. In contrast, the mixtures of the polyurethane prepolymer and crystalline polymers (adhesives 10–12) had both high initial impact strength and shear adhesive strength, with low melt viscosities. Of the adhesives according to the invention, the one containing a crystalline polymer comprising an alkyl acrylamide (adhesive 12) had very high initial impact strength and overlap shear adhesive strength, with a very low melt viscosity.

I claim:

1. A moisture-curable hot-melt composition comprising a polyurethane prepolymer and a crystalline polymer obtained from monomer(s) containing at least one crystalline (meth)acrylate monomer with no active hydrogen.

2. The composition according to claim 1, wherein said crystalline polymer is a polymer obtained from the crystalline (meth)acrylate monomer with no active hydrogen and amorphous ethylenically unsaturated monomer(s) with no active hydrogen.

3. The composition according to claim 2, wherein said crystalline polymer has a melting point of 15°–135° C.

4. The composition according to claim 3, wherein said crystalline (meth)acrylate monomer is a (meth)acrylate ester of a non-tertiary alcohol, the alkyl portion of which comprises 16 or more carbon atoms.

5. The composition according to claim 2, wherein said amorphous ethylenically unsaturated monomer(s) is selected from the group consisting of (meth)acrylate esters of non-tertiary alcohols, the alkyl portions of which comprise no more than 15 carbon atoms, (meth)acrylate esters of alcohols other than alkyl alcohols, vinyl esters, vinyl ethers, alkyl acrylamides, styrene, acrylonitrile, N-vinyllactams, vinylidene chloride and vinyltoluene.

6. The composition according to claim 2, wherein said crystalline polymer contains an alkyl acrylamide.

7. The composition according to claim 1, wherein said crystalline polymer has a melting point of 15°–135° C.

8. The composition according to claim 7, wherein said crystalline (meth)acrylate monomer is a (meth)acrylate ester of a non-tertiary alcohol, the alkyl portion of which comprises 16 or more carbon atoms.

9. The composition according to claim 1, wherein said monomers include 5–100 wt % of a crystalline monomer.

10. The composition according to claim 1, wherein said monomers include 10–90 wt % of a crystalline monomer.

11. The composition according to claim 1, wherein said monomers include 30–80 wt % of a crystalline monomer.

12. The composition according to claim 1, wherein the weight average molecular weight of said crystalline polymer is between 5,000 and 100,000.

13. The composition according to claim 1, wherein the weight average molecular weight of said crystalline polymer is greater than 30,000 and up to 100,000.

14. The composition according to claim 1, wherein the weight average molecular weight of said crystalline polymer is greater than 30,000 and up to 60,000.

15. The composition according to claim 1 which contains said crystalline polymer at an amount of 5–90 wt %.

16. The composition according to claim 1 which contains said crystalline polymer at an amount of 5–80 wt %.

17. The composition according to claim 1 which contains said crystalline polymer at an amount of 5–70 wt %.

18. The composition according to claim 1 which has a melt viscosity at 121° C. (250° F.) of 50,000 centipoise or lower.

19. The composition according to claim 1 which has an initial impact strength of 5 kg·cm or greater.

20. The composition according to claim 1 which has a final strength of 15 kg/cm$^2$ or greater.

21. The composition of claim 1, wherein said crystalline (meth)acrylate monomer is behenyl methacrylate.

22. A method of preparing the moisture-curable hot melt composition of claim 1, comprising the steps of:

providing a polyol;

incorporating a crystalline (meth)acrylate polymer into the polyol;

adding an isocyanate component to the polyol, such that the polyol and the isocyanate component are capable of forming the polyurethane prepolymer having the crystalline (meth)acrylate polymer therein; and reacting the polyol and the isocyanate component such that they form the polyurethane prepolymer.

23. The method of claim 22, further comprising the step of hot-melt coating the moisture-curable, hot-melt composition.

* * * * *

UNITED STATES PATENT AND TRADEMARK OFFICE
CERTIFICATE OF CORRECTION

PATENT NO. : 5,827,926
DATED : October 27, 1998
INVENTOR(S) : Yoshinori Shimizu

It is certified that error appears in the above-identified patent and that said Letters Patent is hereby corrected as shown below:

Column 15, line 21, "250° C.," should be --"25° C.,--.

Signed and Sealed this

Twenty-third Day of February, 1999

Q. TODD DICKINSON

Attest:

Attesting Officer

Acting Commissioner of Patents and Trademarks